UNITED STATES PATENT OFFICE.

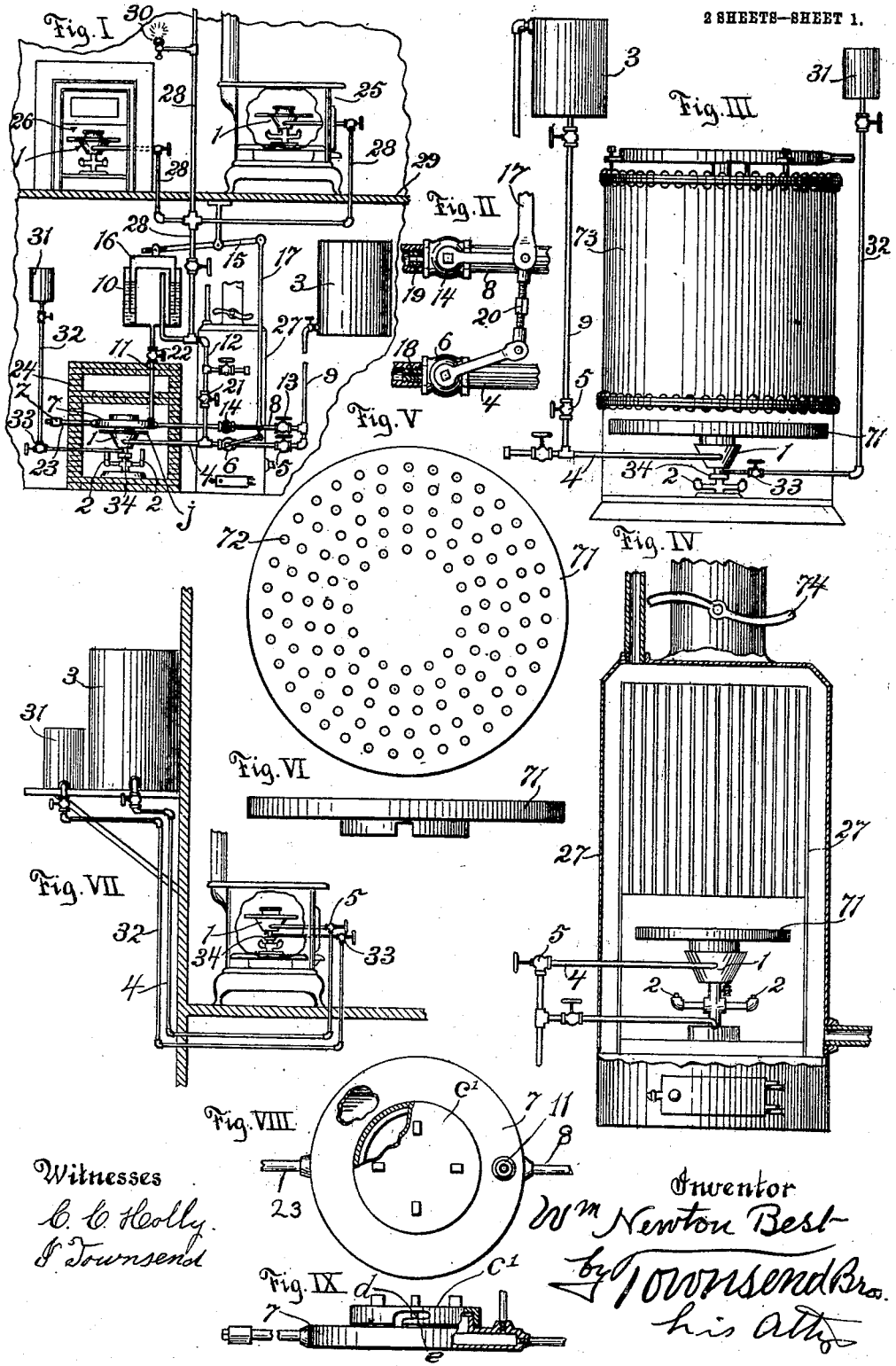

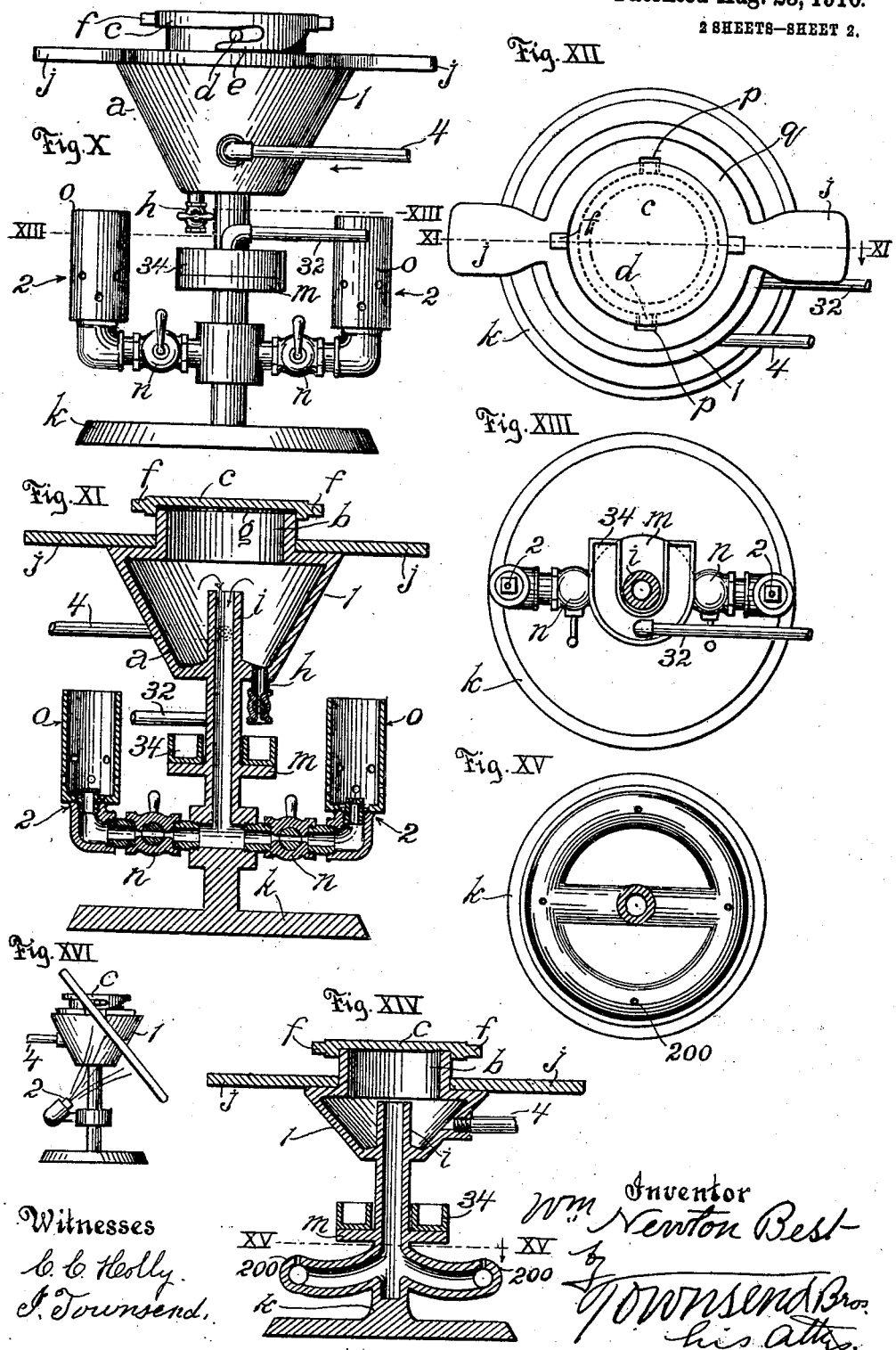

WILLIAM NEWTON BEST, OF NEW YORK, N. Y., ASSIGNOR TO LEVI SCHAEFLE, OF LOS ANGELES, CALIFORNIA, AND JOHN H. BEST AND EZRA BEST, OF QUINCY, ILLINOIS.

OIL-GAS HEATING AND LIGHTING SYSTEM.

968,233.  Specification of Letters Patent.  Patented Aug. 23, 1910.

Application filed May 19, 1902. Serial No. 108,106.

*To all whom it may concern:*

Be it known that I, WILLIAM NEWTON BEST, a citizen of the United States, a resident of the city of New York, borough of Brooklyn, in the county of Kings and State of New York, formerly residing at Los Angeles, in the county of Los Angeles and State of California, have invented a new and useful Oil-Gas Heating and Lighting System, of which the following is a specification.

An object of this invention is to make provision whereby any house may be individually supplied with a permanent fixed gas for heating and lighting purposes from its own gas plant the same being cheap, simple, economical and easy to operate and being adapted to produce gas directly from hydrocarbon oils.

It is a purpose of this invention to supersede the use of highly volatile oils, such as gasolene, for supplying houses with combustibles from individual gas plants or carbureters for heating and lighting. That is to say, I propose to furnish a gas plant of such low cost and such convenient, practical and simple operation that any house piped and fitted for gas may be supplied with a permanent gas from its own individual gas plant at a superior economy as compared with any household gas plant heretofore known.

I overcome the difficulties that have heretofore existed in the use of hydrocarbon oil for domestic lighting and heating and other purposes by generating and fixing the gas in a small highly heated cast metal retort and introducing the same into a receiver under pressure and supplying the gas thus produced to the burners of the system, automatic means being operated by the gas pressure to regulate the production of the gas as the same is used.

Appropriate means for supplying the combustible fluid under a requisite pressure must be provided so that the pressure of gas in the system may be maintained. Such means are indicated by the elevated supply tank 3, the elevation of which is to be sufficient to give the required pressure to supply the fluid to the burner against the pressure of the gas generated. Such elevation may be six feet more or less above the retort; or in cases where this is not convenient, the requisite pressure may be obtained by applying pressure to the oil in the tank by any desirable means such, for instance, as water under pressure applied in the tank to force the oil out through a pipe, not shown, at the top of the oil tank 3.

While the primary object of this invention is the production and use of gas from hydrocarbon oils, it is to be understood that I contemplate using the different parts or combinations of parts in any way and with any material which may be found practicable for the production and use of heating and illuminating gas.

A further object of this invention is to secure increased economy of fuel by providing means whereby individual householders, at a small initial outlay and at a low cost of maintenance, may supply a house with gas for heating and lighting and may cause such gas to be consumed in the most efficient manner for lighting and heating.

One of the objects of this invention is to provide means whereby the generation of gas is effected in a retort under a suitable pressure and the gas may be forced from the tips of the burner by such force as will enable the gas while passing through the air to absorb and intermingle with sufficient oxygen, before the igniting point is reached, so that perfect combustion is obtained, thereby being different from the ordinary burner in as much as but little draft is required.

It is a well known fact that with ordinary hydrocarbon burners a forced draft is required, either by means of a blower or an extended smoke stack or chimney, but with this apparatus and type of burner, forced draft is unnecessary and the draft can be cut down to the minimum, consequently saving much in fuel because of not requiring to heat the superfluous air which by the old method of forced draft, must be forced through the fire box or boiler of the furnace.

In order to accomplish the foregoing objects I have invented a specific form of oil gas generator and burner and an apparatus comprising such generator and burner and other elements combined therewith by means of which the householder may start the process of gas production into operation initially and secondarily and may cause the operation to continue indefinitely with a minimum of expense of attention and fuel. Said specific form of generator and burner is adapted for use in various capacities and may be employed both in the production of the gas from the oil and in the consumption of the gas for domestic heating and cooking and also for heating steam generators and boilers, for heating water for household and other purposes, and for steam boilers for automobiles and for stationary steam plants, for supplying steam for heating and power.

This invention comprises a gas plant or system including a combined generator and burner and various novel parts which go to make up the same.

The accompanying drawings illustrate this invention.

Figure I is a broken view illustrating a plant embodying this invention as applied for the purpose of supplying light, heat, steam and hot water to a house to which said plant appertains individually. Fig. II is a fragmental detail of the device for automatic control of the oil supply. Fig. III is a detail showing a feature of the invention as applied for heating an automobile steam boiler. Fig. IV is a sectional detail of the steam or hot water boiler and heater as shown in Fig. I. Figs. V and VI are respectively a detached plan and elevation of the flame deflector and spreader shown in place in Figs. III and IV. Fig. VII illustrates the mode of applying a part of the invention for heating a cook stove, range or the like. Figs. VIII and IX are broken details in plan and side elevation respectively of the secondary gas generator. Fig. X is a detail elevation of the primary generator and burner substantially shown in Figs. I, III, IV and VII, the gasolene pipe being differently placed in this view to expose the generator drain clearly to view. Fig. XI is a mid-sectional detail of said generator and burner on line XI—XI, Fig. XII, looking from the rear of Fig. X. Fig. XII is a plan of the same as shown in Fig. X. Fig. XIII is a sectional plan on irregular line XIII—XIII, Fig. X. Fig. XIV shows another form of the generator and burner. Fig. XV is a plan of the same from the sectional plane XV—XV. Fig. XVI illustrates a form of the burner as arranged where a side draft is present which may deflect the jet issuing from the jet piece of the burner.

Referring first particularly to Fig. I, the character 1 designates a gas generator or retort; 2 a gas burner connected with the generator 1 to receive gas therefrom and arranged to heat the generator. 3 is a source of oil supply. 4, a valved pipe leading from said oil supply to said generator to supply oil thereto. 5 designates a cut-off valve to close the passage through the pipe 4. 6 designates a regulating valve to regulate the flow of oil through the pipe. 7 designates a secondary gas generator arranged to be heated by said burner 2. 8 designates a valved pipe leading from said oil supply 3 to said secondary generator 7. The pipes 4 and 8 may both be supplied by a pipe 9 of the oil supply tank 3.

10 designates a gas receiver, which may be a gasometer of common construction.

11 designates a pipe leading upward from the secondary generator 7 into the bottom of the gas receiver 10 to conduct the gas from the generator to the receiver and to return any oil of condensation from the receiver to the generator. Said receiver may be a gasometer of the usual construction, and the oil of condensation referred to may result from the generation of vapors in the retort 7 before the same is sufficiently highly heated to produce the desired permanent gas.

It is to be understood that the secondary retort 7 and the primary retort 1 may be of any required size.

In carrying out this invention it is desirable that the generators and burners be made of as simple and inexpensive construction as possible, and in the drawings the same are shown as constructed of cast iron or other metal. It is also desirable that the same shall be readily cleaned and freed from any deposits of solids formed from the hydrocarbon oil from which the gas is to be produced.

12 designates a valved pipe connected with the receiver 10 and opening into the oil supply pipe of the primary generator 1.

13 designates a valve for cutting off the supply of oil through the pipe 8. 14 designates a regulating valve for said pipe 8, the same being controlled by automatic means operated by the gas pressure. Such means may be a lever 15 operatively connected with the bell 16 of the gasometer 10 and operatively connected with the regulating valves 6 and 14 by means of a connecting rod 17. The pipes 4 and 8 may be furnished with contracted passages 18 and 19, respectively; the passage 18 of the pipe 4 being large enough only to supply to the generator 1 the maximum amount of oil which said generator can appropriately use. This amount may be the amount of oil sufficient to produce the maximum quantity of gas which can be consumed by the burners which are supplied by the generator 1. The contracted passage 19 is of that size necessary to carry the maximum amount of oil required by the generator 7 in the operation of the machine. Such passage may be larger than the passage 18 for supplying the initial generator, and the valve 14 which controls the same may be connected with the connecting rod 17 and also with the valve 6, so that when the valve 14 is fully closed, the valve 6 of the pipe which supplies oil to the primary generator will remain just sufficiently open to supply to the generator 1 a minimum quantity of oil which will keep the burners in operation.

This may be understood by referring to Fig. II, in which the operating arms of the valves 6 and 14 are in position to indicate that the valve 14 is fully closed, while the valve 6 is only partially closed. 20 designates an adjustable connection between the arms of the valves 6 and 14 respectively so that the valves may be relatively adjusted to leave a greater or less passage, as may be desired, through the valve 6 when the valve 14 is fully closed.

21 designates a valve in the pipe 12 to stop the same.

The contracted portions 18 and 19 make it possible to open and close the supply of oil to the two retorts by means of a very slight movement of the connecting rod 17 thereby affording a better regulation of the supply of fuel as the pressure varies in the gasometer.

The pipe 12 preferably connects with the pipe 4 between the valve 6 and the generator 1 so that the gas that has been already generated and stored can be used as a pilot light, if desired, by nearly closing the valve 21, or the valve can be opened to a greater extent and the stored gas can be used to supply the burners for generating purposes instead of the liquid fuel from the pipe 9 through valve 5.

22 is a valve for pipe 11 to close the receiver when it is desired to clean the retort through the clean out pipe 23 which may be closed by any suitable means, as a cap $z$, that may be removed to give access for cleaning the retort 7 from outside the inclosing chamber 24.

The retort 1 may serve to produce the gas from the oil and also to superheat or rarefy and fix the same to make therefrom a permanent gas. In some instances the retort 1 may receive oil only and in some instances it may receive only vapor or gas.

In Fig. I, 25 is a cook stove; 26 an open fire place, and 27 a boiler each of which is furnished with a retort 1 and supplied with gas from the generator contained in the chamber 24. Said generator consists of a retort 1, burner 2 and secondary generator or retort 7.

28 designates service pipes for supplying the gas to the house 29, a fragment of which is shown.

30 is an illuminating burner of any character which may be suitable for the gas produced.

31 is a gasolene tank which may be connected by a valved pipe 32 with an oil cup 34 below the retort 1 in some instances. In Figs. I, III and VII, this connection is shown, the purpose being to provide a light oil for use in starting the burner into operation for preventing the production of vapors which may be condensed in smoke or soot while the generator is at a low temperature. After the generator is well heated, the valve 33 may be closed and the valve 5 opened to supply the heavier oil to the generator.

The generator is desirably provided with the open oil cup 34 arranged below the retort 1, and the gasolene pipe 32 opens into said oil cup to supply the same with gasolene for starting. The retort 1 is desirably in form of an inverted cone $a$ having an open top $b$ closed by a removable cap $c$. The open top $b$ may be in the form of a circular collar furnished with lugs $d$ with which slanting hooks $e$ of the cap $c$ engage.

$f$ are projections on the cap by which the cap may be forcibly turned to tighten the same upon an asbestos packing ring $g$, which is placed between the collar $b$ and the cap $c$ to form a tight joint which may be readily opened for the purpose of cleaning the retort.

$h$ is a valved drain pipe which may lead from the bottom of the retort 1 to draw off any liquid residuum which may form therein. The pipe $h$ is preferably so located as to discharge into the cup 34 from which it may be removed or burned, as desired.

$i$ is a gas pipe leading from the retort to the burners, and said gas pipe leads desirably from the upper portion of the cone $a$, thus to conduct to the burners, the more highly rarefied products of the retort.

$j$ designates flame spreaders and heat conductors which extend laterally from the top of the cone $a$ above the burners 2 and 200, so that the flame from the burners will heat the spreaders and conductors which will conduct the heat to the cone for the purpose of generating the gas. At the same time the cone $a$ will be in a measure directly heated by the flame. The cone $a$ and the pipe $i$ may be made of a single casting with the base $k$ which supports the burners and the retort.

$m$ is a support formed integral with the casting to support the oil cup 34, which is desirably of a U or horseshoe form, as clearly shown in Fig. XIII, so that it may be slipped into place around the pipe $i$ beneath the retort.

The burners 200 may be connected with the pipe $i$ directly as shown in Figs. XIV and XV, or by a valved connection $n$, as shown in Figs. X, XI and XII. The burners may be provided with air mixing devices $o$.

The secondary generator 7 may be a separate hollow part mounted above the primary generator and provided with a removable cap $c^1$ fastened in place by suitable means such as lugs $d$ and inclined hooks $e$. Said generator may project above the primary generator 1 to receive the heat of the flame from the burners 2 after the same has acted upon the retort 1. The retort 7 thus serves as an ultimate spreader and distributer of the flame from the burners 2 and in Figs. III, IV, V and VI the substitute spreader 71 is provided to take the place of the generator 7, and in this regard said substitute spreader may be provided with perforations 72 to distribute the flame to the boiler 27 or 73 as the case may be.

In practical use the retort and the burner which heats it may be supplied with any desirable combustible fluid and the amount thereof supplied to the retort and to the burner respectively may be regulated by automatic means controlled by the pressure of the gas produced. The gasometer and the valves 6 and 14 and their connections with the gasometer afford suitable means for accomplishing this purpose; but the invention is not limited to the particular form of means shown.

Desirably, the gasometer is above the retort and the pipe between the two is arranged to conduct the gas from the retort to the gasometer, and to return any oil of condensation to the retort.

I propose to use any suitable material for producing the gas and heat and do not intend to limit the invention to the use of any particular fluid combustible or to the specific form of burner or generator set forth.

In Fig. XII, $p$ designates notches in the ring $q$ of the spreader and conductor members $j$ to allow said ring to be placed on and removed from the collar $b$ without interfering with the lugs $d$.

The heat spreader and conductor formed by the ring $q$ and its projection $j$ is desirably cast in a separate piece which can be removed from time to time and replaced with new, for the reason that the intense heat from the burner causes the spreaders to burn off. When they are thus injured, they may be renewed at slight expense of time, trouble and material. The more expensive retort will thus outlast many of the spreaders and conductors.

What I claim and desire to secure by Letters-Patent of the United States is:—

1. A heating and lighting apparatus comprising a gas generator; a gas burner connected with the generator to receive gas therefrom and arranged to heat the generator; a source of oil supply, a valved pipe leading from said oil supply to said generator to supply oil thereto; a secondary gas generator arranged to be heated by said burner; a valved pipe leading from said oil supply to said secondary generator; a gas receiver, a pipe connected with said secondary generator and leading upward therefrom into the bottom of the receiver to conduct gas from the generator to the receiver, and to return any oil of condensation from the receiver to the generator; a valved pipe connected with said receiver and opening into the oil supply pipe of the primary generator between such generator and a valve of said pipe for the purpose of conducting gas from said receiver to said burner through such pipe and generator for starting the generator into operation secondarily; a cup beneath such generator; a source of gasolene or other high inflammable fluid, and a valved pipe leading from said gasolene supply to said cup for starting said generator into operation primarily.

2. A gas generator comprising two retorts one of which is flat and located above the other, a removable cap for each retort, pipes for supplying fuel thereto, each pipe being provided with a contracted portion, the capacity of said portions being different, means for regulating the passage of fuel through said contracted portions, and means for automatically preventing the passage of fuel through the larger portion without entirely preventing the passage of fuel through the smaller portion.

3. A gas generator comprising two retorts, one above the other, a removable cap for each retort, a gasometer communicating with the upper retort, means for supplying fuel to said retorts, said means being adapted to feed the fuel to the upper retort intermittently and to the lower one constantly but in variable quantities, and a pipe from the gasometer to the lower retort.

4. A gas generator comprising two retorts, one above the other, the upper retort being flat, a removable cap for each retort, a gasometer communicating with the upper retort, valved pipes for supplying the retorts with fuel, and a valved pipe from the gasometer communicating with the pipe to the lower retort intermediate said retort and the valve in said pipe.

5. A gas generator comprising two retorts, one of which is flat and located above the other, a removable cap for each retort, a gasometer connected with the upper retort, and means for feeding fuel to said retorts.

6. A gas generator comprising two retorts one above the other, the upper retort being flat and being provided with a plurality of openings and with lugs, a slotted cap over one of said openings and engaging with said lugs, a pipe leading from the second opening for supplying fuel to the retort; a second pipe leading from a third opening and provided with a removable cap for cleaning the retort; a gasometer, and a third pipe connecting the fourth opening with the gasometer.

7. A gas generator comprising a plurality of retorts, one of which is below the other and in the form of an inverted cone and has an outlet projecting through the bottom with its upper end extending above the bottom, and the lower end adapted to communicate with burners, means for feeding fuel to said retorts, a gasometer communicating with the upper retort, and means operated by the pressure of gas in the gasometer to regulate the fuel feeding means.

8. A gas generator comprising two retorts, the upper retort being flat, a removable cap for each retort, the lower retort having a downwardly-extending outlet provided with a support and is adapted to communicate with burners, a substantially U-shaped open-topped cup on the support, means for feeding fuel to each of said retorts and to said cup, and a gasometer connected with the upper retort.

9. A gas generator comprising a plurality of retorts, one above the other, the upper retort being flat, and the lower one in the form of an inverted cone and provided with an outlet extending downward from the center, burners communicating with said outlet in position for heating the retort, a cap removably mounted on the top of the lower retort, a spreader on said lower retort below said cap, and means for feeding fuel to said retorts.

In testimony whereof, I have signed my name to this specification, in the presence of two subscribing witnesses at Los Angeles, in the county of Los Angeles and State of California, this 12th day of May, 1902.

WILLIAM NEWTON BEST.

Witnesses:
 JOHN A. MORRIS,
 F. M. TOWNSEND.